US012352394B2

(12) United States Patent
Zhang et al.

(10) Patent No.: US 12,352,394 B2
(45) Date of Patent: Jul. 8, 2025

(54) LIGHTING APPARATUS

(71) Applicant: LEEDARSON LIGHTING CO., LTD., Fujian (CN)

(72) Inventors: Yongliang Zhang, Fujian (CN); Hongbin Lin, Fujian (CN); Hongkui Jiang, Fujian (CN)

(73) Assignee: LEEDARSON LIGHTING CO.,LTD., Fujian (CN)

( * ) Notice: Subject to any disclaimer, the term of this patent is extended or adjusted under 35 U.S.C. 154(b) by 0 days.

(21) Appl. No.: 18/774,841

(22) Filed: Jul. 16, 2024

(65) Prior Publication Data

US 2025/0027620 A1 Jan. 23, 2025

(30) Foreign Application Priority Data

Jul. 17, 2023 (CN) ......................... 202321876600.5

(51) Int. Cl.

*F21K 9/238* (2016.01)
*F21V 23/04* (2006.01)
*F21V 29/70* (2015.01)
*F21Y 113/00* (2016.01)

(52) U.S. Cl.

CPC .......... *F21K 9/238* (2016.08); *F21V 23/0435* (2013.01); *F21V 29/70* (2015.01); *F21Y 2113/00* (2013.01)

(58) Field of Classification Search

CPC ...... F21K 9/238; F21V 23/0435; F21V 29/70; F21V 23/045; F21Y 2113/00; F21Y 2115/10

See application file for complete search history.

(56) References Cited

U.S. PATENT DOCUMENTS

| | | | | |
|---|---|---|---|---|
| 2016/0320039 A1* | 11/2016 | You | ........................ | F21V 23/003 |
| 2016/0329624 A1* | 11/2016 | Chen | ...................... | F21V 29/503 |
| 2021/0282251 A1* | 9/2021 | Wu | ......................... | H05B 45/30 |
| 2022/0022298 A1* | 1/2022 | Zhao | ...................... | H05B 47/19 |

FOREIGN PATENT DOCUMENTS

CN 105444008 A * 3/2016 ............ F21V 19/001

OTHER PUBLICATIONS

English translation of Sun CN-105444008-A (Year: 2016).*

* cited by examiner

*Primary Examiner* — Evan P Dzierzynski
(74) *Attorney, Agent, or Firm* — Chun-Ming Shih; LANWAY IPR SERVICES

(57) ABSTRACT

A lighting apparatus includes a light source plate, a driver, an antenna base and an antenna module. The driver includes a wireless circuit. The antenna base unit includes a first plastic unit, a metal contact and a metal path. The antenna base is coupled to the light source plate. The metal contact is electrically coupled to the wireless circuit of the driver. The antenna module includes a metal antenna and a second plastic unit. The second plastic unit and the first plastic unit are two separate components. When the second plastic unit is coupled to the first plastic unit, the metal antenna is electrically coupled to the metal contact of the antenna base for receiving a wireless signal to the wireless circuit of the driver.

20 Claims, 10 Drawing Sheets

LIGHTING APPARATUS

FIELD

The present invention is related to a lighting apparatus, and more particularly related to a lighting apparatus with communication capability.

BACKGROUND

LED (Light Emitting Diode) technology has undergone significant development since its inception in the early 20th century. The first practical LED was developed in 1962 by Nick Holonyak Jr., a scientist at General Electric. Initially, LEDs were limited to emitting low-intensity red light and were used primarily as indicator lights in electronic devices. These early LEDs were inefficient and expensive, which restricted their applications. However, the fundamental principle of electroluminescence, where materials emit light in response to an electric current, laid the groundwork for future advancements.

Throughout the 1970s and 1980s, improvements in materials and manufacturing techniques led to the development of LEDs that could emit light in different colors, including green and yellow. These advancements were driven by the discovery and utilization of new semiconductor materials like gallium phosphide and gallium arsenide. Concurrently, researchers worked on enhancing the efficiency and brightness of LEDs, making them more suitable for practical applications. By the late 1980s, LEDs were being used in digital displays, traffic lights, and signage, though they were still not efficient enough for widespread lighting applications.

The breakthrough that revolutionized LED technology came in the 1990s with the development of blue LEDs by Shuji Nakamura and his colleagues. Using gallium nitride (GaN) and indium gallium nitride (InGaN) as the semiconductor materials, they were able to create high-brightness blue LEDs. This innovation was crucial because it enabled the creation of white light LEDs by combining blue LEDs with phosphors that convert blue light to white light. This breakthrough not only expanded the range of applications for LEDs but also paved the way for their use in general lighting.

As the 21st century progressed, LED technology continued to evolve rapidly. Advances in materials science, particularly the development of more efficient phosphors and quantum dot technologies, have significantly improved the color rendering and efficiency of LEDs. Additionally, improvements in manufacturing processes, such as the development of epitaxial growth techniques and surface coating technologies, have reduced production costs and increased the durability of LEDs. These enhancements have made LEDs the preferred choice for a wide range of applications, from residential and commercial lighting to automotive and outdoor lighting.

Today, LED technology is at the forefront of the lighting industry, driven by its energy efficiency, long lifespan, and versatility. LEDs consume significantly less energy compared to traditional incandescent and fluorescent bulbs, resulting in lower electricity bills and reduced environmental impact. Their long operational life, often exceeding 50,000 hours, reduces the need for frequent replacements, further contributing to their cost-effectiveness and sustainability. The versatility of LEDs allows for innovative lighting solutions, including smart lighting systems that can be controlled remotely and integrated into smart home ecosystems.

Looking ahead, the future of LED technology is promising, with ongoing research focusing on enhancing efficiency, reducing costs, and expanding applications. Emerging technologies such as organic LEDs (OLEDs) and micro-LEDs are poised to further transform the lighting and display industries. OLEDs, known for their flexibility and ability to produce high-quality, vibrant displays, are being used in advanced televisions and smartphones. Micro-LEDs, with their potential for higher brightness and energy efficiency, are expected to revolutionize display technology. As LED technology continues to evolve, it will play a crucial role in addressing global challenges related to energy consumption and sustainability.

Due to its numerous advantages, LED technology is rapidly replacing traditional light sources such as incandescent and fluorescent bulbs. One of the key features driving this replacement is energy efficiency. LEDs use significantly less electricity to produce the same amount of light as traditional bulbs, which translates to substantial energy savings. This efficiency is particularly important in large-scale applications, such as street lighting and commercial buildings, where the cumulative energy savings can be immense. Additionally, LEDs generate very little heat compared to incandescent bulbs, which convert much of their energy into heat rather than light. This not only makes LEDs safer and cooler to touch but also reduces the load on air conditioning systems, leading to further energy savings.

Another crucial feature of LED technology is its long lifespan. LEDs can last up to 25 times longer than traditional incandescent bulbs and about three to five times longer than compact fluorescent lamps (CFLs). This extended lifespan significantly reduces maintenance costs and the frequency of replacements. For businesses and municipalities, this means fewer disruptions and lower labor costs associated with changing bulbs. In residential settings, it translates to convenience and cost savings for homeowners. The long life of LEDs also contributes to environmental sustainability by reducing the number of bulbs that end up in landfills.

LEDs offer unparalleled versatility and design flexibility, which has expanded their use in a wide variety of lighting devices. Their small size and ability to be integrated into compact and innovative designs make them ideal for applications where traditional bulbs would be impractical. For example, LEDs are extensively used in automotive lighting, including headlights, tail lights, and interior lights, due to their durability, energy efficiency, and ability to produce bright, focused light. In the entertainment industry, LEDs are used in stage lighting, displays, and screens, offering vibrant colors and dynamic lighting effects that enhance performances and visual experiences.

In the realm of smart lighting, LEDs are a natural fit due to their compatibility with digital controls. Smart LED bulbs can be controlled remotely via smartphones or integrated into smart home systems, allowing users to adjust brightness, color, and timing according to their preferences. This capability not only adds convenience and customization but also contributes to energy efficiency through features like automatic dimming and motion detection. Moreover, the ability to control LED lighting remotely and programmatically makes them ideal for applications in smart cities, where streetlights and public lighting can be managed centrally to optimize energy use and maintenance schedules.

The environmental benefits of LED technology extend beyond energy efficiency and long lifespan. LEDs are free of hazardous materials such as mercury, which is present in fluorescent bulbs, making them safer for both users and the environment. Their reduced energy consumption means lower greenhouse gas emissions from power plants, contributing to efforts to combat climate change. Additionally, the development of recycling programs specifically for LEDs is making it easier to dispose of them responsibly, further minimizing their environmental impact.

Overall, the features of LED technology—energy efficiency, long lifespan, versatility, and environmental friendliness—have made them the preferred choice for a wide range of lighting applications. From residential homes to commercial buildings, public infrastructure to personal devices, LEDs are becoming ubiquitous. As technology continues to advance, the integration of LEDs into various lighting devices and systems will only increase, driving further innovations and benefits. This widespread adoption of LED technology marks a significant shift in the lighting industry, promising a more sustainable and efficient future.

LED panel lights have become increasingly popular in a variety of settings, including restaurants, living rooms, and commercial environments, due to their ability to provide soft, even lighting. These fixtures consist of an array of LEDs mounted on a flat panel that diffuses the light, creating a smooth and uniform glow that reduces glare and shadows. This quality of light is particularly desirable in spaces where comfort and ambiance are important, such as dining areas and living spaces. In commercial environments, the consistent and high-quality light from LED panels enhances visibility and productivity while maintaining a pleasing aesthetic.

One of the standout features of LED panel lights is their sleek, low-profile design, which allows them to be seamlessly integrated into ceilings and walls. This modern look is not only visually appealing but also saves space and makes the fixtures less obtrusive. The slim design of LED panel lights is ideal for environments with low ceilings or where a minimalist appearance is desired. Additionally, these lights often come in various shapes and sizes, offering flexibility in design and installation to suit different architectural styles and spatial requirements.

Despite the advantages of LED panel lights, there is a growing demand for even more flexible configurations to meet diverse lighting needs. People are increasingly looking for lighting solutions that can be customized and adjusted to fit their specific preferences and requirements. This has led to the development of panel lights with adjustable color temperatures and brightness levels. By incorporating tunable white technology, users can change the color temperature from warm to cool white, adapting the lighting to different activities and times of day. Dimmable options allow for control over light intensity, providing the right amount of light for any setting or mood.

In addition to adjustable lighting, smart technology is playing a significant role in enhancing the flexibility of LED panel lights. Smart panel lights can be controlled via remote controls, smartphone apps, or integrated into smart home systems. This allows users to create and save different lighting scenes, set schedules, and even automate lighting based on occupancy or natural light levels. In commercial environments, smart controls can optimize energy usage and enhance the lighting experience for employees and customers alike. For instance, in a restaurant, different lighting scenes can be programmed for lunch, dinner, and special events, creating the perfect ambiance for each occasion.

Modular designs are another innovation addressing the need for flexible configurations. Modular LED panel lights can be combined and arranged in various patterns to create custom lighting solutions. This adaptability is particularly useful in commercial environments where lighting needs may change over time or vary across different areas of a building. For example, in an office, modular panels can be reconfigured to accommodate changes in layout or function, ensuring that each workspace is optimally lit. Similarly, in retail settings, modular panels can highlight different product displays or create distinct zones within a store.

The continued evolution of LED panel light technology is driven by the desire to provide more personalized and adaptable lighting solutions. As manufacturers respond to consumer demand, we can expect to see further advancements in features such as color rendering, energy efficiency, and user-friendly controls. Innovations like dynamic daylight simulation, which mimics natural light patterns to support human circadian rhythms, and integration with other smart building systems will enhance the functionality and appeal of LED panel lights. By meeting the diverse needs of users in various settings, LED panel lights are set to remain a versatile and essential component of modern lighting design.

The prevalence of light-emitting devices in modern life cannot be overstated. From residential homes to commercial establishments, public infrastructure to personal gadgets, lighting solutions play a critical role in our daily activities and overall well-being. With the widespread adoption of light devices, even a small advancement in their technology or design can lead to significant improvements and widespread impact. These improvements not only enhance the functionality and user experience but also contribute to energy efficiency, cost savings, and environmental sustainability.

Given the extensive use of lighting devices, continuous innovation in this field is crucial. A key area of focus is the flexibility of lighting solutions. Users increasingly demand lighting systems that can be tailored to their specific needs and preferences. This includes the ability to adjust brightness and color temperature, customize lighting scenes, and integrate with smart home systems. Flexible lighting solutions can enhance comfort, productivity, and mood, making them highly desirable in various settings such as homes, offices, and public spaces.

In addition to flexibility, the functional capabilities of lighting devices are paramount. Modern lighting systems are expected to do more than just illuminate a space. They should support various activities, improve safety and security, and contribute to aesthetic appeal. For instance, in commercial environments, lighting can enhance the shopping experience or increase productivity in the workplace. In public spaces, intelligent lighting systems can provide dynamic illumination that responds to environmental conditions and user movement, improving safety and energy efficiency.

Cost is another critical factor in the development of lighting technologies. As lighting devices are ubiquitous, cost-effective solutions can lead to substantial savings for consumers and businesses alike. Advances that reduce the manufacturing and operational costs of lighting systems without compromising performance are highly beneficial. This includes innovations in materials, production processes, and energy consumption. Lower costs can accelerate the adoption of advanced lighting technologies, making them accessible to a broader range of users and applications.

Robustness and durability are essential considerations for lighting devices, especially in demanding environments. Lighting systems must withstand various conditions, including fluctuations in temperature, humidity, and mechanical stress. Enhancing the robustness of lighting devices ensures their longevity and reliability, reducing maintenance costs and minimizing disruptions. This is particularly important for applications in industrial settings, outdoor lighting, and critical infrastructure where consistent performance is crucial.

Ultimately, the pursuit of innovation in lighting technology involves a holistic approach that considers multiple factors: flexibility, functionality, cost, and robustness. By addressing these aspects, new advancements can bring about substantial improvements in human life. Enhanced lighting solutions can provide better quality of life through improved comfort and aesthetics, greater efficiency through reduced energy consumption and costs, and increased safety and productivity. As such, ongoing research and development in this field are not only beneficial but essential to harnessing the full potential of lighting technology to meet the evolving needs of society.

SUMMARY

In some embodiments, a lighting apparatus includes a light source plate, a driver, an antenna base and an antenna module.

The driver includes a wireless circuit.

The antenna base unit includes a first plastic unit, a metal contact and a metal path.

The antenna base is coupled to the light source plate.

The metal contact is electrically coupled to the wireless circuit of the driver. and The antenna module includes a metal antenna and a second plastic unit.

The second plastic unit and the first plastic unit are two separate components.

When the second plastic unit is coupled to the first plastic unit, the metal antenna is electrically coupled to the metal contact of the antenna base for receiving a wireless signal to the wireless circuit of the driver.

In some embodiments, the first plastic unit has a socket.

The second plastic unit has a plug.

The plug is inserted into the socket to fix the second plastic unit to the first plastic unit.

In some embodiments, an elastic reverse hook structure is disposed as a connection between the first plastic unit and the second plastic unit after the plug is inserted into the socket to prevent the plug being detached from the socket.

In some embodiments, the socket has multiple slots for selectively inserting multiple metal antennas.

In some embodiments, the multiple slots correspond to different transmission protocols.

The metal antenna is designed for one transmission protocol and is plugged to the slot associated to said one transmission protocol.

In some embodiments, the wireless circuit detects which slot has been connected to the metal antenna to switch to the transmission protocol associated with the slot that is plugged with the metal antenna.

In some embodiments, more than one metal antennas of the same transmission protocol are installed to more than one slots of the socket.

Said more than one metal antennas are headed to different directions.

In some embodiments, the wireless circuit selects one metal antenna with a best signal quality among the multiple metal antennas and disable other metal antennas.

In some embodiments, a first portion of the metal antenna is above the light source plate and a second portion of the metal antenna is below the light source plate.

In some embodiments, the light source plate has a hole for containing the first plastic unit.

In some embodiments, a light source is placed on a front side of the light source plate.

The driver includes a driver plate.

The driver plate is disposed on a bottom side of the light source plate.

In some embodiments, the wireless circuit is disposed on the light source plate, instead of being disposed on the driver plate.

In some embodiments, the wireless circuit is disposed in the first plastic unit.

In some embodiments, the wireless circuit is disposed on the second plastic unit.

In some embodiments, the light source includes multiple LED modules fixed on the front side of the light source plate by wave soldering.

In some embodiments, the metal antenna protrudes above the light source plate perpendicularly.

In some embodiments, a thermal dissipation path is disposed for carrying a portion of heat of the light source to the metal antenna.

In some embodiments, the lighting apparatus may also include a main housing, an Edison cap and a light shell.

The main housing encloses the driver plate.

The light shell covers the light source plate for allowing a light of the light source to pass through.

In some embodiments, the main housing has a rotation structure for a user to rotate the rotation structure to change a direction of the metal antenna without moving the Edison cap with respect to an Edison socket that is coupled to the Edison cap.

In some embodiments, the main housing has a sleeve structure for selectively changing an exposure distance of the metal antenna above the light source plate.

DETAILED DESCRIPTION

Figure 4:
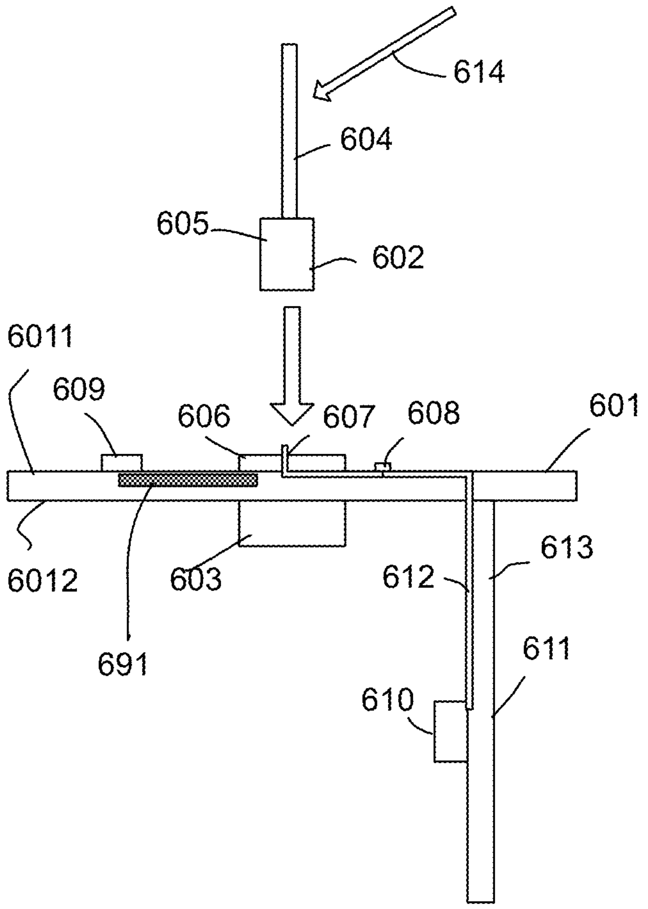
FIG. 4 shows a lighting apparatus embodiment.

In FIG. 4, a lighting apparatus includes a light source plate 601, a driver 611, an antenna base 603 and an antenna module 605.

The driver 611 includes a wireless circuit 610.

The antenna base 603 includes a first plastic unit 606, a metal contact 608 and a metal path 607.

The antenna base 603 is coupled to the light source plate 601.

The metal contact 608 is electrically coupled to the wireless circuit 610 of the driver 611.

The antenna module 605 includes a metal antenna 604 and a second plastic unit 602.

The second plastic unit 602 and the first plastic unit 606 are two separate components.

When the second plastic unit 602 is coupled to the first plastic unit 606, the metal antenna 604 is electrically coupled to the metal contact 608 of the antenna base 603 for receiving a wireless signal 614 to the wireless circuit 610 of the driver 611.

In some embodiments, the first plastic unit has a socket. The second plastic unit has a plug.

Figure 1:
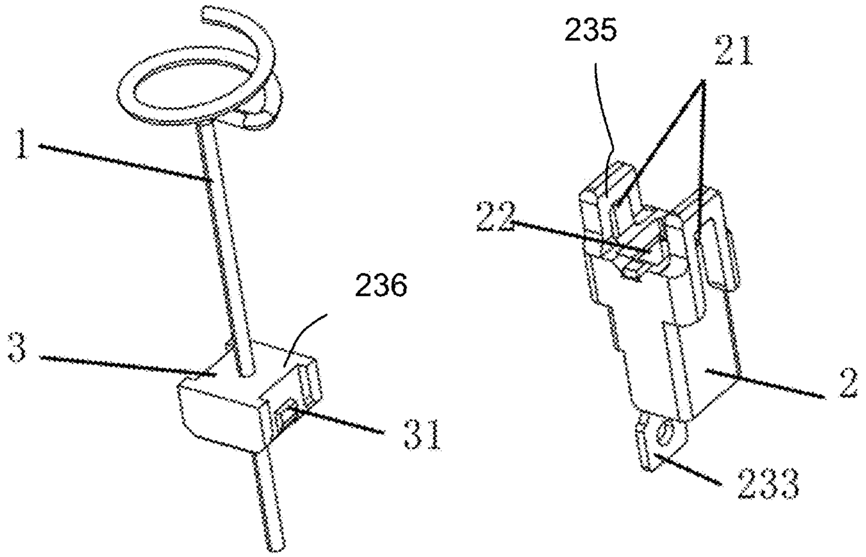
FIG. 1 illustrates an example of an antenna module.

FIG. 1 shows such an example, the first plastic unit has a socket 235 corresponding to a plug 236 of the second plastic unit. The socket 235 matches the shape of the plug 236 so that they can be connected together when inserting the plug 236 into the socket 235.

The plug is inserted into the socket to fix the second plastic unit to the first plastic unit.

In some embodiments, an elastic reverse hook structure is disposed as a connection between the first plastic unit and the second plastic unit after the plug is inserted into the socket to prevent the plug being detached from the socket.

Figure 5:
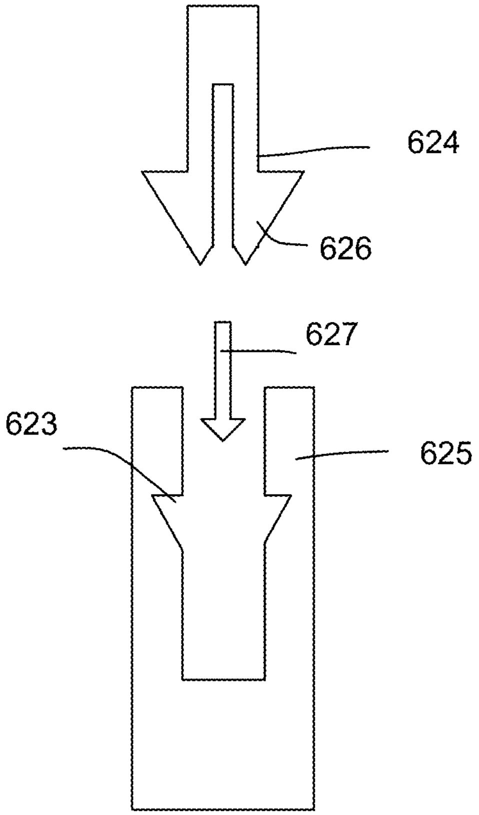
FIG. 5 shows a reverse hook structure.

FIG. 5 shows a hook structure comprising a first component 624 and a second component 625. The first component has an elastic arrow hook 626 that can be deformed to pass through an entrance in the direction 627 illustrated in FIG. 5 When the elastic arrow hook 626 is located in the desired position, a reverse groove 623 of the second component 625 releases the deformation of the elastic arrow hook 626 and meanwhile lock the elastic arrow hook 626.

Figure 6:
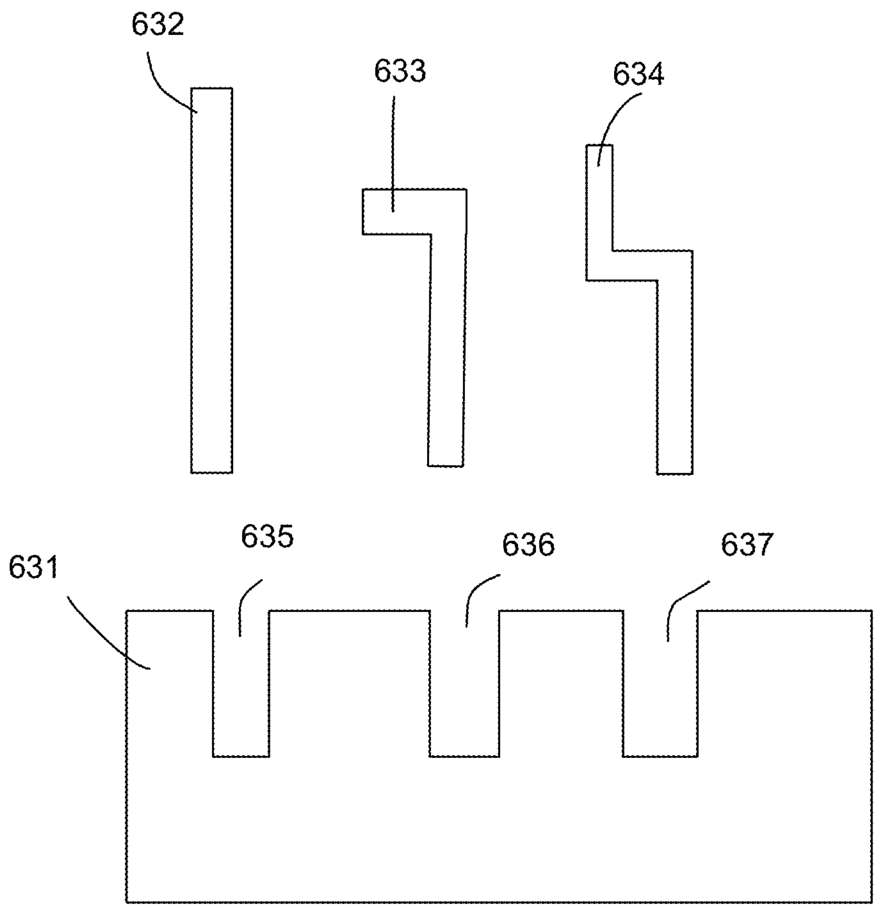
FIG. 6 shows multiple slots for inserting antennas of different transmission protocols.

In FIG. 6, the socket 631 has multiple slots 635, 636, 637 for selectively inserting multiple metal antennas 632, 633, 634.

In some embodiments, the multiple slots correspond to different transmission protocols. For example, the metal antenna 632 corresponds to Wi-Fi, the metal antenna 633 corresponds to Bluetooth, and the metal antenna 634 corresponds to 4G.

In some embodiments, the second plastic units for different transmission protocols may have different sizes, shapes for preventing mistaken plugging.

The metal antenna is designed for one transmission protocol and is plugged to the slot associated to said one transmission protocol.

In some embodiments, the wireless circuit detects which slot has been connected to the metal antenna to switch to the transmission protocol associated with the slot that is plugged with the metal antenna.

In such design, the wireless circuit supports multiple transmission protocols and it may detect the impedance to detect whether a slot is plugged in a metal antenna to determine which processing logic should be adopted to handle the wireless transmission.

In some embodiments, more than one metal antennas of the same transmission protocol are installed to more than one slots of the socket.

This can be used for MIMO for using multiple antennas to perform the communication. MIMO, which stands for Multiple Input Multiple Output, is a technology used in wireless communication to enhance the capacity and reliability of data transmission. By employing multiple antennas at both the transmitter and receiver ends, MIMO systems can send and receive multiple data streams simultaneously. This parallel data transmission significantly increases the data rate and improves spectral efficiency, allowing for faster and more robust wireless communication. The technology exploits spatial diversity, where the different paths taken by the signals through the environment can be used to improve the quality of the received signal and combat fading and interference.

In practical applications, MIMO technology is a cornerstone of modern wireless communication standards such as LTE (Long-Term Evolution), Wi-Fi (IEEE 802.11n and beyond), and 5G. It enables the efficient use of available bandwidth and enhances the user experience by providing higher throughput and more reliable connections. MIMO also supports advanced features like beamforming, where the direction of the signal is dynamically adjusted to improve performance and reduce interference. This makes MIMO an essential technology for meeting the growing demand for high-speed wireless data services and ensuring robust connectivity in densely populated areas.

Said more than one metal antennas are headed to different directions.

Figure 7:
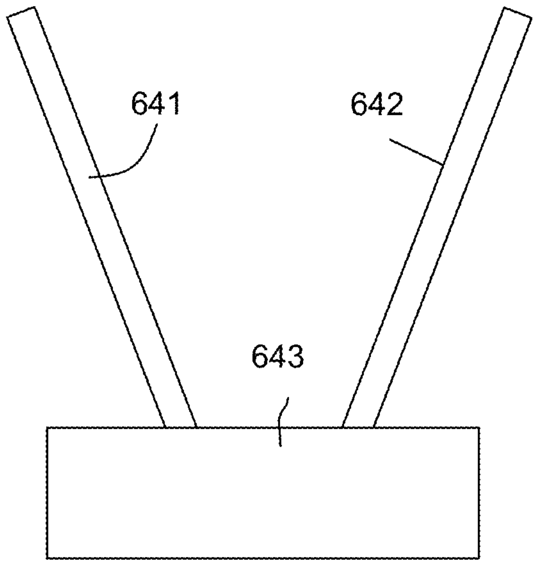
FIG. 7 shows two metal antennas of the same transmission protocol are disposed for different directions.

FIG. 7 shows that two metal antennas 641, 642 of the same transmission protocol are disposed on a socket 643 so that to receive wireless signals at the same time. In some other embodiments, because a lighting apparatus is fixed to a platform, not easy to move, it would be often that one direction is easier to receive wireless signal while the other direction fails to do that successfully. In such case, the wireless circuit may detect which antenna provides better signal quality and uses that antenna as the medium to receive or to transmit wireless signals.

In some embodiments, the wireless circuit selects one metal antenna with a best signal quality among the multiple metal antennas and disable other metal antennas.

In some embodiments, a first portion of the metal antenna is above the light source plate and a second portion of the metal antenna is below the light source plate.

Figure 8:
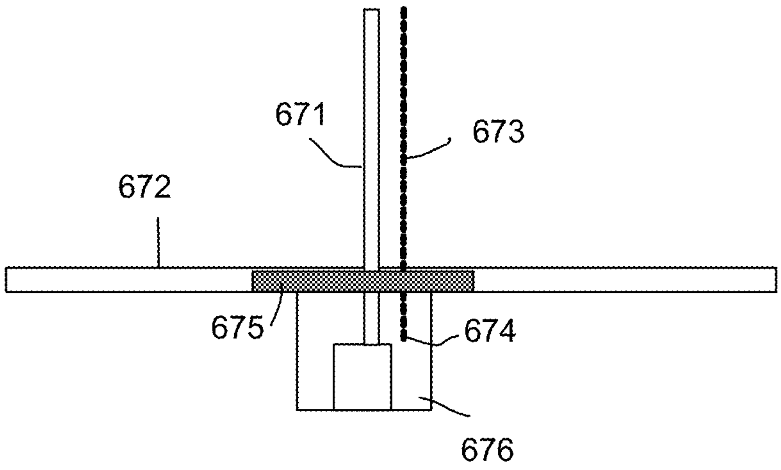
FIG. 8 shows a component arrangement for an antenna with respect to the light source plate.

FIG. 8 shows such an arrangement. In FIG. 8, the metal antenna 671 has a first portion 637 above the light source plate 672 and has a second portion 674 below the light source plate 672. This may reduce the exposed portion of the metal antenna 671 to reduce the shadow it may cause for affecting the overall light pattern.

In some embodiments, the light source plate 672 has a hole 675 for containing the first plastic unit 676.

In FIG. 4, a light source 609 is placed on a front side 6011 of the light source plate 601.

The driver 611 includes a driver plate 613.

The driver plate 613 is disposed on a bottom side 6012 of the light source plate 601.

In some embodiments, the wireless circuit is disposed on the light source plate, instead of being disposed on the driver plate.

In some embodiments, the wireless circuit is disposed in the first plastic unit.

In some embodiments, the wireless circuit is disposed on the second plastic unit.

In some embodiments, the light source 609 includes multiple LED modules fixed on the front side of the light source plate by wave soldering.

In some embodiments, the metal antenna 604 protrudes above the light source plate perpendicularly as illustrated in FIG. 4.

In some embodiments, a thermal dissipation path 691 is disposed for carrying a portion of heat of the light source 609 to the metal antenna 604.

Figure 3:
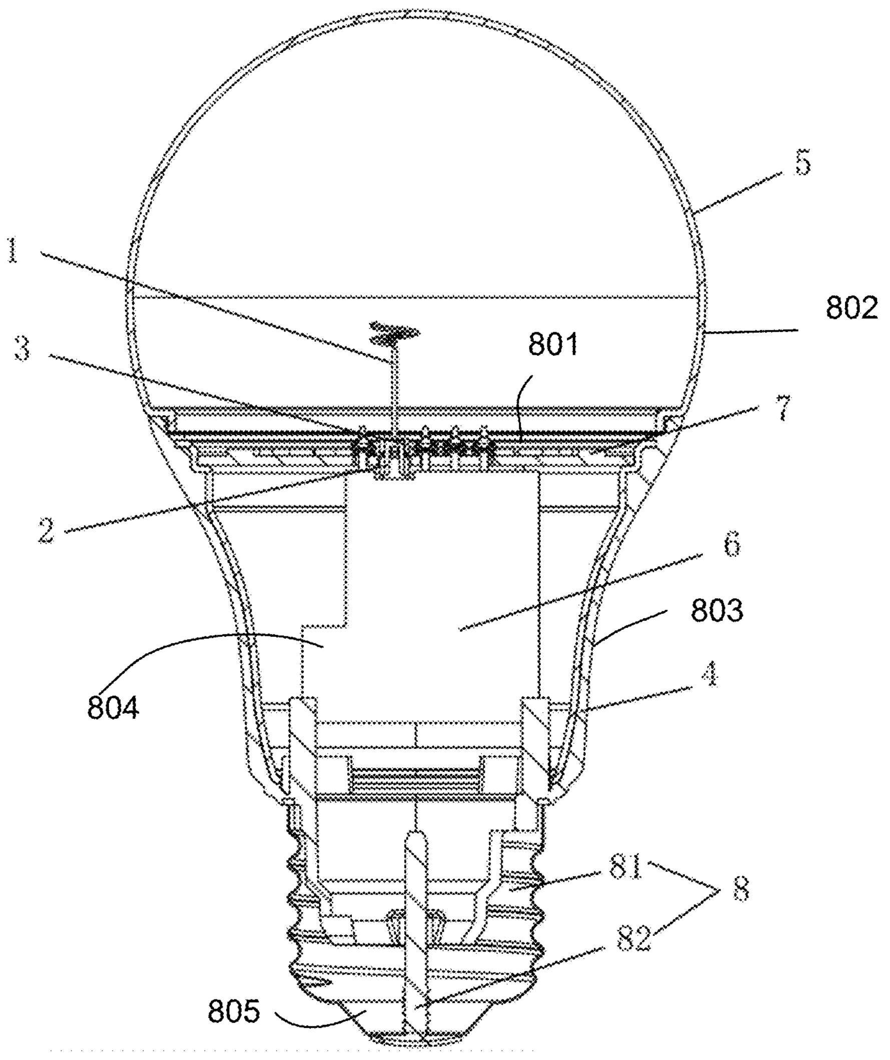
FIG. 3 illustrates a light bulb example.

In FIG. 3, the lighting apparatus, as a light bulb, may also include a main housing 803, an Edison cap 805 and a light shell 801.

The main housing 803 encloses the driver plate 804.

The light shell 802 covers the light source plate 801 for allowing a light of the light source to pass through.

In some embodiments, the main housing has a rotation structure for a user to rotate the rotation structure to change a direction of the metal antenna without moving the Edison cap with respect to an Edison socket that is coupled to the Edison cap.

Figure 9A:
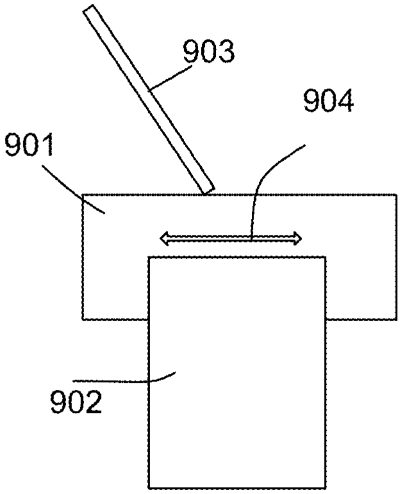
FIG. 9A and FIG. 9B show a rotation structure for changing direction of an antenna.
Figure 9B:
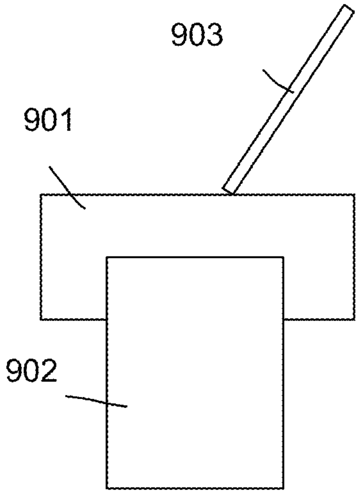

FIG. 9A and FIG. 9B show such an example. In FIG. 9A, the rotation structure 901 on the main housing 901 provides a rotation of the metal antenna 903 with respect to a fixed position when the main housing 902 has been fixed to an Edison socket (not shown here).

FIG. 9B shows when the metal antenna 903 is rotated to another angle to better receive a wireless signal while not moving the lighting apparatus with respect to the Edison socket. Sometimes, to adjust the Edison socket with respect to the Edison cap may loosen the light bulb from the platform, which may cause problem. This design help solve such problem.

In some embodiments, the main housing has a sleeve structure for selectively changing an exposure distance of the metal antenna above the light source plate.

Figure 10A:
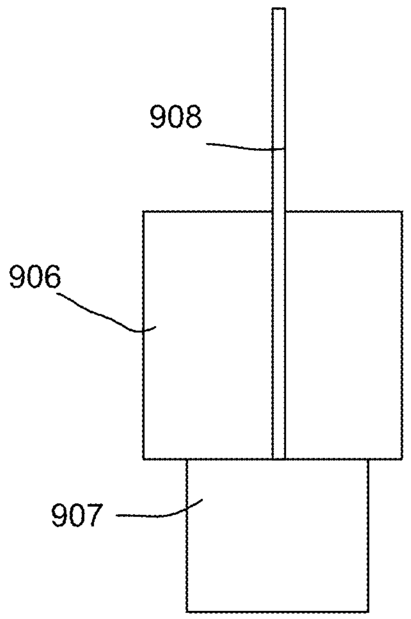
FIG. 10A and FIG. 10B show a sleeve structure to adjust exposure of an antenna.
Figure 10B:
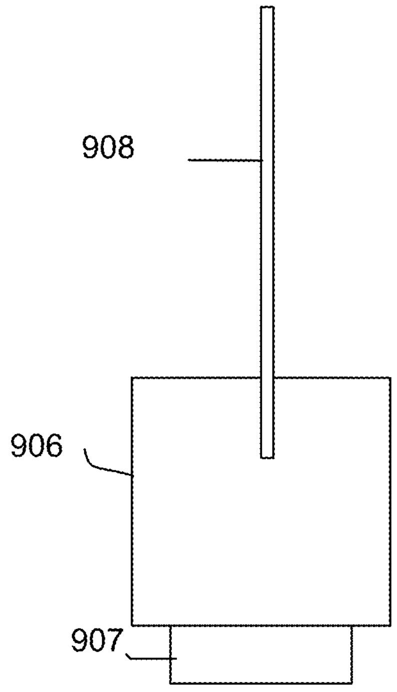

FIG. 10A and FIG. 10B shows such an example, the main housing has a first sleeve housing 906 and a second sleeve housing 907 that may move with respect to each other to change the exposure height of the metal antenna 908.

Figure 2:
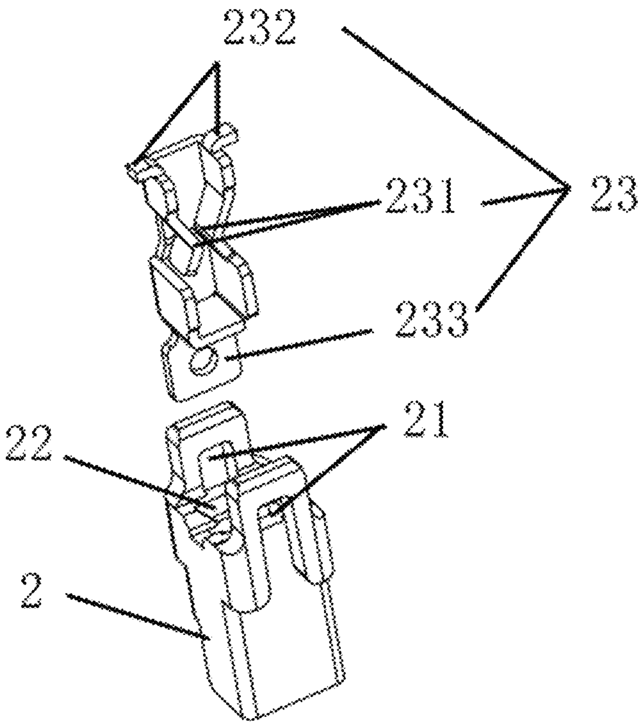
FIG. 2 illustrates two plastic units to be coupled together.

Please refer to FIG. 1 to FIG. 3, which show an embodiment.

FIG. 1 shows a schematic diagram of the antenna terminal structure of a specific embodiment of the present utility model. As shown in FIG. 1, the antenna terminal structure includes an antenna 1, a first terminal 2, and a second terminal 3. A positioning groove, which mates with the second terminal 3, is formed on the first terminal 2. The antenna 1 is threaded through the second terminal 3, and both sides of the second terminal 3 are provided with first buckles 31. The first terminal 2 is provided with first slots 21 that mate with the first buckles 31. The first terminal 2 and the second terminal 3 are connected by the first buckles 31 and the first slots 21. The positioning groove is an open groove formed by the protrusions on both sides of the first slot 21, which can precisely match the overall structure of the second terminal 3. This antenna terminal structure can add a second terminal 3 as a fixing component to the antenna 1, allowing it to be fixed to the corresponding first terminal 2 during installation. The combination of the first terminal 2 and the second terminal 3 thus achieves the effect of fixing the antenna 1, preventing displacement and detachment during the installation process. Additionally, it addresses the issue of antenna 1 shadow caused by its excessive length while saving space, thereby better utilizing the space in the panel frame.

In specific embodiments, the second terminal 3 is provided with a mounting hole through which the antenna 1 can be fixedly mounted to the second terminal 3.

It should be noted that in this embodiment, one end of the antenna 1 can be a straight-line structure or a helical structure. In other embodiments, one end of the antenna 1 can be a U-shaped structure, which can also achieve the technical effect of the present utility model.

Continuing with reference to FIG. 2, FIG. 2 shows an exploded schematic diagram of the first terminal 2 of a specific embodiment of the present utility model. As shown in FIG. 2, the first terminal 2 is provided with a connecting groove 22 that mates with the extended end of the antenna 1. Both sides inside the connecting groove 22 are provided with spring pieces 23, which electrically connect the antenna 1 and the first terminal 2 through the spring pieces 23. The arrangement of the spring pieces 23 inside the connecting groove 22 facilitates the electrical connection between the antenna 1 and the first terminal 2.

In specific embodiments, the spring piece 23 is provided with an elastic clamping structure 231 in the middle, with a spacing smaller than the diameter of the antenna 1. The lower part of the spring piece 23 is also provided with a connecting plate 233. The elastic clamping structure 231 helps to position the antenna 1 inside the first terminal 2 and facilitates the electrical connection between the spring piece 23 and the antenna 1.

In specific embodiments, the upper end of the spring piece 23 is provided with a transverse outer edge 232 that is larger than the connecting groove 22. The transverse outer edge 232 prevents the spring piece 23 from falling out of the first terminal 2.

In other embodiments, the first terminal 2 can be a female terminal, and the second terminal 3 can be a male terminal. The female terminal has a positioning groove that mates with the male terminal. The antenna 1 is threaded through the male terminal, and both sides of the male terminal are provided with buckles. The female terminal has slots that mate with the buckles, and the female and male terminals are connected through the buckles and slots. The female terminal is provided with a connecting groove 22 that mates with the extended end of the antenna 1. Both sides inside the connecting groove 22 are provided with spring pieces 23, which electrically connect the antenna 1 and the female terminal through the spring pieces 23. Of course, the first terminal 2 can be a male terminal, and the second terminal 3 can be a female terminal, as long as they can be connected by buckles to fix the antenna 1 and ensure it does not move or fall off while maintaining electrical connection with the antenna 1.

According to the second aspect of the present utility model, a lamp is proposed. FIG. 3 shows a cross-sectional schematic diagram of an antenna terminal structure and a lamp according to a specific embodiment of the present utility model. As shown in FIG. 3, the lamp includes the antenna terminal structure described above, as well as a heat sink 4, a bulb shell 5, and a lamp head assembly 8. The heat sink 4 has openings at both ends, with the bulb shell 5 located at the larger opening of the heat sink 4 and the lamp head assembly 8 located at the smaller opening. A driver board 6 is positioned within the heat sink 4, and a light source board 7 is also positioned within the heat sink 4, covering the end of the heat sink 4 near the bulb shell 5. One end of the light source board 7 is electrically connected to the driver board 6, and the other end of the driver board 6 is electrically connected to the lamp head assembly 8. Both the driver board 6 and the light source board 7 are PCB boards. The overall configuration of this lamp device is compact and simple to assemble. In the above embodiments, the antenna 1 is fixedly connected through the buckle connection of the first terminal 2 and the second terminal 3, thereby avoiding waste of space on the light source board 7.

Further referring to FIGS. 1 to 3, the antenna terminal structure is set on the driver board 6. The first terminal 2 and the driver board 6 are electrically connected through the connecting plate 233, with the antenna terminal structure fixedly mounted on the driver board 6 and electrically connected to it through the connecting plate 233.

In specific embodiments, a through-hole is provided at the position on the light source board 7 corresponding to the antenna terminal structure. The second terminal 3 passes through the through-hole and is set on the driver board 6. This through-hole prevents the signal emitted by the antenna 1 from being shielded by the light source board 7, thereby ensuring the transmission rate of the antenna 1 signal.

In specific embodiments, the lamp head assembly 8 includes a pin 82 and a lamp head 81. The lamp head 81 is screwed onto the heat sink 4, and the pin 82 is inserted into the lamp head 81, thereby electrically connecting the pin 82 to an external power source.

In specific embodiments, a second slot is provided on the heat sink 4, and the driver board 6 has a second buckle that matches the second slot. The heat sink 4 and the driver board 6 are connected through the second buckle and the second slot, thereby fixedly mounting the driver board 6 on the heat sink 4 without the need for additional fixtures, thus saving on process costs.

The specific assembly process of the antenna terminal structure and the lamp is as follows:

The first terminal 2 is fixedly mounted on the driver board 6 through reflow soldering. The driver board 6 is then snapped into the corresponding second slot of the heat sink 4. After installing the light source board 7, it is riveted in place. The second terminal 3 with the antenna is then snapped into the first terminal 2 for fixation. Finally, the bulb shell 5 is fixedly connected to the heat sink 4 by applying adhesive. Using a fixture, the lamp head 81 is riveted to the heat sink 4, and then the pin 82 is riveted in place.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source plate;

a driver, wherein the driver comprises a wireless circuit;

an antenna base, wherein the antenna base comprises a first plastic unit, a metal contact and a metal path, wherein the antenna base is coupled to the light source plate, wherein the metal contact is electrically coupled to the wireless circuit of the driver; and an antenna module comprising a metal antenna and a second plastic unit, wherein the second plastic unit and the first plastic unit are two separate components, wherein when the second plastic unit is coupled to the first plastic unit, the metal antenna is electrically coupled to the metal contact of the antenna base for receiving a wireless signal to the wireless circuit of the driver.

2. The lighting apparatus of claim 1, wherein the first plastic unit has a socket, wherein the second plastic unit has a plug, wherein the plug is inserted into the socket to fix the second plastic unit to the first plastic unit.

3. The lighting apparatus of claim 2, wherein an elastic reverse hook structure is disposed as a connection between the first plastic unit and the second plastic unit after the plug is inserted into the socket to prevent the plug being detached from the socket.

4. The lighting apparatus of claim 2, wherein the socket has multiple slots for selectively inserting multiple metal antennas.

5. The lighting apparatus of claim 4, wherein the multiple slots correspond to different transmission protocols, wherein the metal antenna is designed for one transmission protocol and is plugged to the slot associated to said one transmission protocol.

6. The lighting apparatus of claim 5, wherein the wireless circuit detects which slot has been connected to the metal antenna to switch to the transmission protocol associated with the slot that is plugged with the metal antenna.

7. The lighting apparatus of claim 4, wherein more than one metal antennas of the same transmission protocol are installed to more than one slots of the socket, wherein said more than one metal antennas are headed to different directions.

8. The lighting apparatus of claim 7, wherein the wireless circuit selects one metal antenna with a best signal quality among the multiple metal antennas and disable other metal antennas.

9. The lighting apparatus of claim 1, wherein a first portion of the metal antenna is above the light source plate and a second portion of the metal antenna is below the light source plate.

10. The lighting apparatus of claim 9, wherein the light source plate has a hole for containing the first plastic unit.

11. The lighting apparatus of claim 9, wherein a light source is placed on a front side of the light source plate, wherein the driver comprises a driver plate, wherein the driver plate is disposed on a bottom side of the light source plate.

12. The lighting apparatus of claim 11, wherein the wireless circuit is disposed on the light source plate, instead of being disposed on the driver plate.

13. The lighting apparatus of claim 11, wherein the wireless circuit is disposed in the first plastic unit.

14. The lighting apparatus of claim 11, wherein the wireless circuit is disposed on the second plastic unit.

15. The lighting apparatus of claim 11, wherein the light source comprises multiple LED modules fixed on the front side of the light source plate by wave soldering.

16. The lighting apparatus of claim 15, wherein the metal antenna protrudes above the light source plate perpendicularly.

17. The lighting apparatus of claim 15, wherein a thermal dissipation path is disposed for carrying a portion of heat of the light source to the metal antenna.

18. The lighting apparatus of claim 11, further comprising a main housing, an Edison cap and a light shell, wherein the main housing encloses the driver plate, wherein the light shell covers the light source plate for allowing a light of the light source to pass through.

19. The lighting apparatus of claim 18, wherein the main housing has a rotation structure for a user to rotate the rotation structure to change a direction of the metal antenna without moving the Edison cap with respect to an Edison socket that is coupled to the Edison cap.

20. The lighting apparatus of claim 18, wherein the main housing has a sleeve structure for selectively changing an exposure distance of the metal antenna above the light source plate.

* * * * *